United States Patent [19]

Murphey

[11] Patent Number: 4,466,831

[45] Date of Patent: Aug. 21, 1984

[54] RAPIDLY DISSOLVABLE SILICATES AND METHODS OF USING THE SAME

[75] Inventor: Joseph R. Murphey, Duncan, Okla.

[73] Assignee: Halliburton Company, Duncan, Okla.

[21] Appl. No.: 423,911

[22] Filed: Sep. 27, 1982

Related U.S. Application Data

[62] Division of Ser. No. 265,821, May 21, 1981, Pat. No. 4,391,643.

[51] Int. Cl.$^3$ ............................................. C04B 19/04
[52] U.S. Cl. ........................................................ 106/74
[58] Field of Search .......................................... 106/94

[56] References Cited

U.S. PATENT DOCUMENTS 4,125,651 11/1978 Campbell et al. ..................... 106/74
4,312,673 1/1982 Neely ................................... 106/74

Primary Examiner—James Poer
Attorney, Agent, or Firm—G. Keith deBrucky; Thomas R. Weaver

[57] ABSTRACT

Rapidly dissolvable powdered silicates having a molar ratio of silicon dioxide to alkali metal oxide in the range of from about 1.5:1 to about 3.3:1 wherein the alkali metal is selected from the group consisting of sodium, potassium and mixtures thereof. Methods of using the powdered silicates and resulting solutions in connection with sealing and cementing, especially of well formations, are provided.

5 Claims, No Drawings

RAPIDLY DISSOLVABLE SILICATES AND METHODS OF USING THE SAME

This is a division, of application Ser. No. 265,821 filed May 21, 1981, now U.S. Pat. No. 4,391,643.

In the drilling, completion and remedial treatment of oil, gas and water wells, it is often desirable and necessary to seal earth formation zones in the wells to prevent excessive fluid flow or loss in the zones, to divert fluids from one zone to another, and to accomplish other purposes. In addition, in such well operations, it is often necessary or desirable to cement casing or other apparatus in the well bore. For example, it is common practice in sealing well formations to inject cement into the well and to allow the cement to set in the desired location to seal this portion of the well. Also, when fixing casing in the well, the casing is cemented to the formation to retain the casing in place and to seal the production formation from the remaining formations.

A particular problem in using cement for the sealing of earth formations is that cement often cannot penetrate to a desired location through the formation matrix. Therefore, gelable liquids have been used to provide the penetration required. While many different gelable liquids have been used, gelable aqueous sodium silicate solutions have achieved wide acceptance. In utilizing aqueous sodium silicate solutions to seal earth formations, the sodium silicate can be combined with acid forming or buffering agents to produce fluids with specific gel times. The silicate-agent solutions are injected into the formations and allowed to set whereby the resulting firm impermeable masses seal the formations.

Aqueous sodium silicate solutions have also been used to seal earth formations wherein the sodium silicate solutions are caused to gel by contact with a separate gelling agent or catalyst. For example, an acid solution can be introduced into the formation prior to or after the introduction of the sodium silicate solution. Upon the contact of the sodium silicate solution with the acid solution, gelling occurs producing an impermeable mass which seals the formation. Solutions containing calcium or other polyvalent cations are also suitable as gelling agents.

Sodium silicate solutions have also been used in low concentrations to seal more permeable portions of formations undergoing water flooding. In this application, a sodium silicate solution is added to the flood water so that as the sodium silicate contacts calcium in the more permeable zones in the formation as it flows through such zones, it floculates thereby plugging the more permeable zones and diverting flood water to other less permeable zones, thereby increasing the production of oil therefrom.

In utilizing aqueous sodium silicate solutions for sealing earth formations, aqueous solutions of sodium silicate are transported to the location of a well penetrating the formation in a concentrated form (typically, 40% sodium silicate). This concentrated sodium silicate solution is then mixed with water at the well site to produce the injected fluid. A particular problem with this method is that the aqueous solutions can freeze during transport or in storage at the well site thereby ruining the silicate solution. Also, such concentrated aqueous solutions are extremely caustic and, like all caustic liquids, are difficult to handle and mix. Further, the handling and shipping of the concentrated aqueous solutions of sodium silicate are expensive, especially in offshore drilling and remote locations where storage is limited.

Another problem in the use of aqueous sodium silicate solutions for sealing earth formations is that sodium silicate is extremely sensitive to certain materials found in some earth formations and in some mixing liquids. For example, formations containing di- or polyvalent cations such as calcium can produce a flash-gelling or floculation of the sodium silicate solutions preventing penetration of the solutions to proper locations. Similary, sodium silicate solutions cannot be mixed with brines because premature gelling occurs.

In cementing casing to the well bore it has often been found that preflushes pumped ahead of the cement to prepare the well bore for cementing can damage the surface of the well bore. For example, preflushes through anhydrite formations often dissolve the formation expanding the diameter of the well bore and weakening the zones in which the cement-to-formation bond occurs. To seal the formation against this type of deterioration, sodium silicate solutions have been introduced into the preflush. This method, however, is not completely satisfactory since good cement bonding is still not achieved in certain situations. Particularly, sodium silicate solutions floculate when they encounter sodium chloride salts of the type present in anhydrite formations. Consequently, sodium silicate solutions are not able to fully protect formations from dissolving and weakening because floculation prevents penetration of the silicate into the formations and the silicate can be lost through redissolution.

Another problem with using sodium silicate as a preflush in cementing is that the cement-carrying conduits contain residual amounts of calcium despite efforts to clean the conduits. This residual calcium which contaminates the conduits can prematurely cause gelling or floculation of the sodium silicate solution which prevents the sodium silicate from functioning properly.

Another use of aqueous sodium silicate solutions is as a dispersant and a gelling agent in a wet cement mixture. By adding a sodium silicate solution to the cement mixture as it is mixed, the cement is more evenly dispersed. If the concentration of the sodium silicate in the cement mixture is high enough, the setting time of the cement mixture is reduced. As with the other uses of sodium silicate solutions described above, problems are encountered with storage and handling of concentrated aqueous sodium silicate solutions. The sodium silicate solutions can also gel prematurely when the cement powder is added, making mixing difficult.

By the present invention, a rapidly dissolvable powdered silicate is provided. The powdered silicate not only is rapidly dissolvable but also has a high ratio of silicon dioxide to alkali metal oxide making it usable in sealing and cementing methods. By means of the powdered silicate, silicate solutions and silicate mixtures for use at well sites can be prepared rapidly. Further, the powdered silicate of the present invention is easily transported and stored even in low temperature conditions which would freeze and destroy aqueous silicate solutions. The costs of handling and transporting the silicate are reduced since the powder weighs less and has a lower volume.

The rapidly dissolvable powdered silicate of the present invention useful in the methods described herein has a ratio of silicon dioxide to alkali metal oxide in the range of from about 1.5:1 to about 3.3:1. To improve the gelling ability, strength and concentration of the silicon dioxide which gels from the silicate solution, it is desirable to have a high ratio of silicon dioxide to alkali metal oxide. Such high ratio also reduces the amount of alkali metal oxide which must be neutralized to produce gelling. However, higher ratios are generally more difficult to dissolve. Therefore, it is preferable to maintain the ratio of silicon dioxide to alkali metal oxide in the range of from about 2.0:1 to about 2.7:1. Most preferably, the ratio of silicon dioxide to alkali metal oxide is maintained at a ratio of about 2.5:1. Silicates of such ratio have short dissolution times while still having relatively high silicon dioxide densities. Some methods of making the powdered silicate can produce higher ratios, while still maintaining short solubility times. In many cases, however, these methods are uneconomical.

In the past, anhydrous powdered silicates have been commercially available with ratios of silicon dioxide to alkali metal oxide in the range of from about 1.5:1 to about 4.0:1. However, these silicates have not been easily dissolvable regardless of the particle size. Therefore, powdered silicates have not been utilized to prepare aqueous solutions of silicates for sealing earth formations.

As described above, the ability to dissolve alkali metal silicates decreases as the ratio of silicon dioxide to alkali metal oxide increases. Thus, some powdered silicates having very low (less than 1.5:1) ratios of silicon dioxide to alkali metal oxide have been prepared for forming aqueous silicate solutions. These, however, have not been suitable for use in connection with wells or sealing earth formations because the solutions are overly alkaline and are not easily gelled.

In order to be rapidly dissolvable, the powdered silicate is preferably partially hydrated. Over-hydration or under-hydration, however, produces an unsatisfactory powder. Over-hydration (more than about 20% water content by weight) produces amorphous particles which tend to flow and slowly convert to crystalline silicate which is slowly soluble. Under-hydration (less than about 12% water content by weight) results in particles which are crystalline initially and, therefore, are not dissolvable. Most preferably, the partially hydrated powdered silicate of the present invention has a water content in the range of from about 14% to about 16% by weight of the hydrated silicate. Amorphous particles with this hydration are relatively stable and are easily dissolved.

The powdered silicate of the present invention is comprised of amorphous particles of the partially hydrated silicate. Crystalline particles are not readily dissolvable.

In the powdered silicates of the present invention, either sodium or potassium or mixtures thereof can be utilized as the alkali metal in the silicate. The powdered silicate of the present invention can be represented by the formula $SiO_2:M_2O$. As stated above, M is selected from the group consisting of sodium, potassium and mixtures thereof. Other alkali metals, such as lithium and rubidium are not suitable because of their significantly different properties. As will be discussed hereinbelow, sodium silicates and potassium silicates have different properties and potassium silicates or mixtures of potassium silicates are more suitable for particular applications.

In the preparation of the rapidly dissolvable powdered silicate of the present invention, dehydration by heating a solution of appropriate silicon dioxide-alkali metal oxide ratio is not suitable. Dehydration by heating or boiling of such a solution produces a stable silicate which is only very slowly soluble.

To produce a rapidly dissolvable powdered silicate, two methods are appropriate. The first method consists of spray drying a silicate solution having a temperature less than 100° F. The spray drying produces a powder of amorphous glass particles. Furthermore, it allows production of a partially hydrated powdered silicate having a water content in the range of from about 14% to about 16% by weight of the hydrated silicate. As stated above, this range of partial hydration and the amorphous glass quality of the particles have a significant effect upon the ability of the silicate to dissolve.

In producing the powdered silicate by spray drying, a silicate solution having a desired ratio of silicon dioxide to alkali metal oxide in the range of from about 1.5:1 to about 3.3:1 is prepared and maintained at a temperature lower than 110° F. and preferably lower than 85° F. This solution is delivered to a spray drying device which produces rapid cooling and rapid dehydration of small droplets of the solution. In the process of rapidly cooling and dehydrating, the droplets pass from an equilibrium to a non-equilibrium state such that an easily soluble amorphous glass particle is formed. The cooling and dehydration must be rapid enough to prevent the silicate from being converted to a slowly soluble crystal state. If necessary, the solution can be refrigerated and the spray directed against a cooled baffle or the like.

The second method of preparing the rapidly dissolvable powdered silicate also utilizes rapid dehydration at a relatively low temperature. In this method, however, dehydration is achieved by adding a dehydration agent to the silicate solution of the appropriate ratio. During the dehydration, the solution must be maintained at a temperature less than 110° F. and preferably less than 85° F. Furthermore, to avoid crystallization and agglomeration of some of the amorphous particles, it is necessary to rapidly shear the solution as the dehydration agent is added. Preferred dehydration agents include ethanol, methanol and acetone. Less suitable are isopropyl alcohol, butyl alcohol, and ethylene glycol monobutyl ether. Also less suitable are saturated salt solutions such as those of sodium chloride and potassium chloride.

As a dehydration agent such as ethanol is added to the silicate solution undergoing rapid shearing, particles of partially hydrated amorphous silicate are precipitated from the silicate solution. These particles are separated from the liquid and then dried without heating. For example, additional alcohol can be added to the particles and then allowed to evaporate at room temperature.

In either the spray drying or precipitation methods, trace amounts of lithium and copper can be added to help prevent crystallization of the silicates. Lithium provides an undersized atomic particle and copper provides an oversized atomic particle to assist in breaking up crystalline patterns as they form. Other suitable undersized or oversized atomic particles can be utilized.

In order to be rapidly dissolvable, it is desirable to have the amorphous particles of the powdered silicate smaller than 40-mesh size. If a significant number, 10% for example, of particles are larger than 40-mesh size, the solution time is sufficiently long that field use is hampered. To arrive at a powder having less than 40-mesh size, the powder resulting from the preparation methods can be screened or ground until the appropriate size is achieved. Also, the particle size can be controlled in the formation process of spray drying or precipitation with methods that are well-known.

By utilizing the powdered silicate of the present invention, an improved method of preparing an aqueous silicate solution for use in connection with sealing or cementing earth formations at a well site can be achieved. In such method of preparing an aqueous silicate solution, the rapidly dissolvable partially hydrated powdered silicate is prepared having a molar ratio of silicon dioxide to alkali metal oxide in the range of from about 1.5:1 to about 3.3:1. The powdered silicate is then transported to the well location and dissolved to form an aqueous silicate solution. The resulting solution is used in processes of sealing or cementing. If desired, the powdered silicate can be stored at the well location prior to its use. Furthermore, the storage can occur at temperatures below freezing without adverse effect to the powdered silicate material.

In some situations, the only water available at well locations contains salt. Thus, it is desirable to be able to form a silicate solution by mixing the powdered silicate with brine. While sodium silicates tend to gel prematurely when mixed with brine, partially hydrated potassium silicates do not. Therefore, it is desirable to utilize a partially hydrated powdered silicate consisting essentially of potassium silicate when the aqueous solution is to be prepared with brine. The potassium silicate does not gel prematurely upon mixing with the brine. If, however, the salt concentration of the brine is very high, especially with calcium or magnesium salts, or the resulting solution is to be stored more than three or four hours, it is desirable to add a sequestering agent to the solution. Organo-phosphates are suitable sequestering agents. With the addition of such a sequestering agent, the solution can be stored for several days.

While potassium silicate solutions are less reactive with sodium, calcium, and other di- and polyvalent ions than sodium silicate solutions, gelling still results upon combination with a sufficient amount of these agents or a sufficient amount of reaction time. The slower gelling time and higher concentration of gelling agent or catalyst can, therefore, be utilized to produce gelling at a desired time or location where sodium silicate would not be suitable. For example, in earth formations containing sodium, calcium and/or di- and polyvalent ions (anhydrite earth formations, for example), a potassium silicate can be utilized where a sodium silicate would floculate prematurely without sufficient penetration of the formation. In one useful process, a potassium silicate solution is prepared which will gel when combined with the di- or polyvalent cations or salts of the type in the earth formation and will penetrate the formation without premature floculation. The amount of penetration can be varied by changing the acidity of the potassium silicate solution, changing the silicon dioxide:-potassium oxide ratio, or adding sequestering agents to the solution. Of course, the proper solution will depend upon the type and concentration of reactant ions present in the earth formation. After the potassium silicate solution is prepared using the highly dissolvable, partially hydrated, powdered, amorphous potassium silicate of the present invention, the silicate solution is introduced into the earth formation and allowed to gel thereby sealing the formation.

By utilizing the same di- or polyvalent cations or salts in an injection fluid, the potassium silicate solution can be used in a method whereby alternate slugs of the injection fluid and the potassium silicate solution are introduced to the well formation for sealing. This method is useful for sealing vugular, matrix or channel type earth formations. This alternate introduction of the potassium silicate solution and the injection fluid containing cations which gel the solution into the formation produces gelling of the potassium silicate solution at a desired location. As described above, the potassium silicate solutions are less reactive with the injection fluid containing gelling agents and therefore allow a deeper penetration of the formation.

Since Portland type cements contain di- or polyvalent cations, e.g., calcium cations, a use of the above method is to utilize Portland cement as the gelling agent fluid. Because the cement will penetrate the vugular and larger channel portions of the formation and then set sealing those portions, a particularly desirable result is obtained. Another fluid containing di- or polyvalent cations is brine. Since brine is often the only readily available fluid at well formation locations and brine is often not capable of being used with sodium silicates, the use of potassium silicate in accordance with the method of this invention allows brine to be used in forming and using silicate solutions.

Another particularly advantageous use of the rapidly dissolvable powdered silicate of the present invention is as a component of a cement powder. A mixture of Portland cement and the rapidly dissolvable powdered silicate of the present invention produces a cement powder which has improved properties. Upon mixing, the cement is more evenly dispersed with a water mixture. By varying the concentration of the powdered silicate in the cement powder, the setting time of the cement can be either increased or decreased. Also, the powdered silicate increases the strength of the cement at high temperatures and creates a temperature stable cement. In addition, it increases the water:cement ratio.

Particularly useful as an additive to cement is potassium silicate powder. Potassium silicate is less sensitive to contamination of the cement and allows the cement to penetrate further into salt containing formations. If desired, similar advantages can be achieved by adding potassium silicate to the mixing water in mixing the cement slurry.

While many of the above methods of using the powdered silicate of the present invention are particularly adapted for use with potassium silicate, many processes can advantageously use combinations of potassium silicate and sodium silicate. This allows the differing properties of the silicates to be utilized and combined in a single powder or application. Thus, mixtures of potassium and sodium silicates can be used to vary the gelling time or the duration of gelling in various applications. Since sodium silicates are less expensive than potassium silicates, mixtures also allow the cost of the silicate use to be reduced.

Another particularly suitable use for potassium silicate as opposed to sodium silicate solutions is as a preflush for cementing casing to a well bore. Particularly in situations where the well bore extends through anhydrite earth formations, sodium silicate preflushes are not completely satisfactory since they tend to floculate upon contact with a sufficient concentration of sodium in the earth formation. Accordingly, flushing the earth formation with an aqueous solution of potassium silicate allows penetration of the formation by the potassium silicate which is more slowly gelled by calcium in the formation, by gelling agents circulated ahead of or with the cement, or other methods. This gelled penetration of the formation protects the formation from deterioration during preflush and prepares the formation for bonding with the cement which follows.

In order to facilitate a clear understanding of the silicate compositions and methods of the present invention, the following examples are given.

EXAMPLE 1

600 cc of acetone and 300 cc of a 40 BaumACU/e/, 3.32 ratio sodium silicate solution (Diamond Shamrock "grade 40" sodium silicate) are combined in a Waring blender at low speed. The speed of the blender is turned up to high to insure dissolution since the silicate solution instantaneously dehydrates. The resulting precipitate is filtered, washed with additional acetone and allowed to dry overnight without heating. All of the foregoing is conducted at room temperature.

After drying overnight, the precipitate is brushed from the drying surface and redissolved in water to its original solubility. The solution is complete within 3 minutes. The above experiment is also performed with the same results utilizing ethanol and methanol as substitutes for the acetone and potassium silicate as a substitute for the sodium silicate. Drying more rapidly at 100° F. creates a material which is more easily dissolved.

The foregoing shows that rapidly dissolvable partially hydrated amorphous powdered silicates with high ratios can be prepared. However, this is a relatively expensive process.

EXAMPLE 2

Powdered silicates are prepared by spray drying aqueous silicate solutions at room temperature. The molar ratios of the silicates vary from 1.8 to 3.2. Both sodium silicates and potassium silicates are prepared. The resulting powders are tested for solubility, the results of which are shown in Table I below.

TABLE I

| SOLUBILITY OF POWDERED SILICATES | | |
|---|---|---|
| Mole Ratio of | Solubility | |
| Silicate/Alkali | Na$_2$O | K$_2$O |
| 1.8 | S | — |
| 2.0 | SS | — |
| 2.2 | NS | S |
| 2.4 | NS | S |
| 2.6 | NS | SS |
| 2.8 | NS | NS |
| 3.0 | NS | NS |
| 3.2 | NS | NS |

NS - Not soluble in tap water in 10 minutes time while stirring a 50% solution.
SS - Slowly soluble in tap water - a hazy solution with some undissolved solids after 10 minutes stirring.
S - A relatively clear solution after no more than 10 minutes stirring at 80° F.

This experiment shows that commercial spray dried preparations of the powder of the present invention result in powder which has less solubility with molar ratios higher than 2.5.

EXAMPLE 3

In northeastern Utah, lost circulation of drilling mud is encountered while drilling at 12,000 feet. The drill string is raised to a point known to be above the zone where lost circulation is likely. A potassium silicate solution is mixed from a rapidly soluble hydrated powder at ambient temperatures at which it would be impossible to store and mix the liquid sodium silicate due to freezing. 4,000 lbs. of the potassium silicate powder are mixed with 35 barrels of water and injected through the drill string. After adding 5 barrels of fresh water spacer, 100 sacks of API Class G cement is mixed and injected in a conventional manner. Shut off is achieved and drilling is resumed.

As shown in this Example, potassium silicate powders can be utilized under conditions which make the use of sodium silicate solutions impossible. It shows that use of potassium silicates results in easier delivery methods with less concern for contamination.

EXAMPLE 4

In an area where lost circulation is a common problem in cementing surface pipe, a potassium silicate solution is prepared by dissolving 1000 lbs. of rapidly dissolving hydrated potassium silicate powder in 380 gallons of water. Addition of the powder is through a conventional cement jet mixer. The solution is recirculated once through the mixer and then pumped as a preflush ahead of a conventional cement slurry. The ordinary calcium contamination inevitably present in the cement handling equipment which generally precludes the use of sodium silicate in a similar manner, causes no problems with the potassium silicate solution used.

The procedure is also used on three wells on successive days. Surface pipe depths are 680 feet, 579 feet and 626 feet. In each case, the procedure is successful. Lost circulation is controlled and cement return is recovered at the surface.

This Example shows that potassium silicate preflushes ahead of cementing produce desirable sealing and preparation of the formation. It also shows that potassium silicates can be utilized where sodium silicates cannot due to contamination of the mixing equipment.

EXAMPLE 5

In long string cementing of a casing (4800 to 5400 feet depths) through an anhydrite formation, 12,000 lbs. of rapidly dissolving potassium sodium powder of the present invention are mixed with 12,000 lbs. of commercially available ethyl acetate and 300 barrels of water which solution is pumped as a preflush ahead of the conventional cement slurry. Following the gelling of the preflush in the formation and setting of the cement about the casing, sonic testing is performed and shows that the cement bond is satisfactory. Sodium silicate solutions might not be satisfactory since floculation often occurs upon encountering an anhydrite formation. It also shows the use of the ethyl acetate (a well-known acid forming gelation agent for silicates) to assist in and to assure proper gelling.

EXAMPLE 6

In an offshore well, having a formation known to be unable to support the cement column, a powdered potassium silicate solution is mixed for sealing and stabilizing the formation. The solution is prepared by dissolving 120,000 lbs. of the highly dissolvable potassium silicate in 30,000 gallons of sea water. This solution is pumped as a preflush through the based drill string ahead of 200 barrels of cement slurry. The drill string is then raised and the casing is lowered followed by conventional cementing of the casing. The resulting cement bond with the casing achieves a satisfactory strength.

This Example shows that use of the powdered silicate in locations where storage of silicate solutions would be impossible can be achieved. This Example also illustrates the reduced costs of transportation and handling of powdered silicates as compared to aqueous silicate solutions. Further, this Example shows that sea water and brines can be utilized with potassium silicates whereas sodium silicates tend to gel or floculate and be less effective.

EXAMPLE 7

Highly dissolvable powdered potassium silicate is mixed with cement and tested in a standard API thickening time test for an 8000 foot casing schedule. This test is made side-by-side with a cement mixture utilizing an aqueous sodium silicate additive of equal silicate strength. The first test compares 3% by weight silicate-to-cement mixtures. The results show thickening times of about four hours for each. The viscosity of the potassium silicate run is substantially lower throughout the four-hour working time. Initial strengths are lower for the potassium silicate showing a delayed strength development in comparison with the sodium silicate.

Several similar tests are run with varying concentrations of silicates using both fresh water and sea water. The results indicate similar thickening times for the liquid sodium silicate and the powdered potassium silicate. The potassium silicate mixtures show lower viscosity slurries and delayed strength development.

This Example shows that highly dissolvable powdered silicates of the present invention can be mixed with cement to produce an improved slurry with controllable thickening times. It also shows that potassium silicate has properties which provide improved cement slurries for some uses.

What is claimed is:

1. A rapidly dissolvable partially hydrated powdered silicate comprising a mixture of sodium silicate and potassium silicate wherein:
   the molar ratio of silicon dioxide to sodium oxide in the sodium silicate is in the range of from about 1.5:1 to about 3.3:1;
   the molar ratio of silicon dioxide to potassium oxide in the potassium silicate is in the range of from about 1.5:1 to about 3.3:1; and
   said powdered silicate has a water content in the range of from about 14% to about 16% by weight of hydrated silicate.

2. The hydrated powdered silicate of claim 1 wherein the powder is comprised essentially of amorphous particles of the type produced by rapid drying and cooling of a potassium silicate and sodium silicate solution.

3. The hydrated powdered silicate of claim 2 wherein a substantial portion of the particles which make up said powdered silicate have a size smaller than 40-mesh.

4. Th hydrated powdered silicate of claim 1 wherein said powder consists essentially of amorphous particles of the type produced by precipitation of a potassium silicate and sodium silicate solution resulting from the addition of hydrophilic material to the solution.

5. The hydrated powdered silicate of claim 4 wherein a substantial portion of the particles which made up said powdered silicate have a size smaller than 40-mesh.

* * * * *